United States Patent [19]

Lovison

[11] Patent Number: 5,223,357
[45] Date of Patent: Jun. 29, 1993

[54] PROMOTIONAL DISPLAY SIGNAGE AND METHOD OF MANUFACTURE

[75] Inventor: Douglas I. Lovison, Carlsbad, Calif.

[73] Assignee: Signs & Glassworks, Inc., Vista, Calif.

[21] Appl. No.: 829,418

[22] Filed: Feb. 3, 1992

[51] Int. Cl.$^5$ .................................. G02B 5/32
[52] U.S. Cl. .................................. 430/1; 430/2; 359/1; 40/546; 40/615; 156/244.22; 156/272.6
[58] Field of Search .......... 430/1, 2; 359/1, 2; 40/546, 615; 283/86, 87, 109, 110; 428/38; 156/244.22, 272.6, 99

[56] References Cited

U.S. PATENT DOCUMENTS

| | | | |
|---|---|---|---|
| 3,900,641 | 8/1975 | Woodman et al. | 428/38 |
| 3,931,425 | 1/1976 | Kuroda | 428/38 |
| 4,421,380 | 12/1983 | McGrew | 359/23 |
| 4,500,374 | 2/1985 | Nakazima | 156/85 |
| 4,551,372 | 11/1985 | Kunert | 428/38 |
| 4,684,795 | 8/1987 | Colgate | 430/2 |
| 4,721,635 | 1/1988 | Helinski | 428/15 |
| 4,838,965 | 6/1989 | Bussard | 430/2 |
| 4,933,218 | 6/1990 | Longobardi | 428/38 |
| 4,971,646 | 11/1990 | Schell et al. | 283/86 |
| 4,978,593 | 12/1990 | Yin et al. | 430/1 |
| 5,082,703 | 1/1992 | Longobardi | 428/38 |

FOREIGN PATENT DOCUMENTS

| | | | |
|---|---|---|---|
| 61-238079 | 10/1986 | Japan | 430/1 |
| 61-272772 | 12/1986 | Japan | 430/2 |
| 63-143580 | 6/1988 | Japan | 430/2 |
| 63-287988 | 11/1988 | Japan | 430/2 |
| 63-287989 | 11/1988 | Japan | 430/2 |
| 2143986 | 2/1985 | United Kingdom | 40/584 |

Primary Examiner—Charles L. Bowers, Jr.
Assistant Examiner—Martin J. Angebrannt
Attorney, Agent, or Firm—Nydegger & Associates

[57] ABSTRACT

A decorative promotional display signage and its method of manufacture includes the steps for combining the constituent elements of the signage, and the resultant combination of these elements. The signage includes a clear transparent substrate with an informational image created on the posterior surface of the substrate by selectively depositing transparent colored inks on this surface. Clear ink may also be deposited on selected portions of the posterior surface of the substrate to emphasize the informational image. A sheet of holographic film, to present a variable color cast to the image, is adhered to the substrate with the layers of ink positioned between the substrate and the holographic film.

18 Claims, 1 Drawing Sheet

PROMOTIONAL DISPLAY SIGNAGE AND METHOD OF MANUFACTURE

FIELD OF THE INVENTION

The present invention pertains generally to advertising and promotional signage. More particularly, the present invention pertains to signs and promotional displays which use coated or painted transparent substrates with reflective backings for their combined visual effect. The present invention is particularly, but not exclusively, useful as a display signage which incorporates the color casting effect achieved by using a holographic film.

BACKGROUND OF THE INVENTION

The essential purpose of promotional display signage is to describe or present a product, an organization or an idea in a manner which will induce the public to buy, support or approve of it. To be effective, the signage must be attractive.

General notions as to what can be done with a sign to effectively attract public notice include having the sign convey an understandable message, making the sign aesthetically pleasing or artistically interesting, and relying on an element of novelty. In actual practice, all of these notions are often compatibly used together in the production of the signage.

Several signs and methods for manufacturing signs have been proposed. More specifically, several proposals have been made for signs which in some way incorporate transparent substrates. For example, U.S. Pat. No. 4,933,218 which issued to Longobardi and which is assigned to the same assignee as the present invention, discloses a "Sign with Transparent Substrate" which effectively incorporates the use of inks on a transparent substrate for unique visual effects. Still, there are ever present possibilities for other combinations of structure which present new or unusual visual effects that, when properly used on a sign, will enhance its attractiveness and make the sign more attractive in its presentation. Holography presents one such possibility.

As is well known to persons skilled in the relevant art, holography involves recording and reconstructing the wave front emanating from an illuminated object. The result is that various spectral effects and color casts can be created for the object. If done properly, this holographic effect can be artistically interesting. Heretofore, however, one problem has been concerned with how to effectively incorporate holography into commercial advertising signage.

In light of the above, it is an object of the present invention to provide a decorative promotional display sign with holographic highlights which is attractive for commercial purposes. Another object of the present invention is to provide a decorative promotional display sign whereon holographic highlights can be selectively positioned to enhance other images on the sign. Still another object of the present invention is to provide a decorative promotional display sign with holographic highlights which is relatively easy to manufacture and comparatively cost effective.

SUMMARY OF THE INVENTION

In accordance with the present invention a decorative promotional display signage with holographic highlights includes a clear transparent substrate. The substrate can be either glass, or plastic, or some other suitable material and it should have a substantially flat posterior surface. The intended informational image to be used for the sign is created by depositing at least one transparent layer of colored ink on selected portions of the posterior surface of the substrate. Additionally, a layer of clear transparent ink can be deposited on these same or different selected portions of the substrate's posterior surface to emphasize and enhance the image created by the colored ink. Finally, a layer of opaque ink can be deposited directly against selected portions of the colored ink to flatten the color effect from those portions of the colored ink which are covered by the opaque ink.

A sheet of holographic film is attached across the posterior surface of the substrate to position the inks between the substrate and the film. The surface of the holographic film which is attached to the substrate is textured to spectrally refract light and present a variable color cast according to the angle from which the film is viewed. With this combination the informational image on the substrate can be presented with holographic highlights.

The novel features of this invention, as well as the invention itself, both as to its structure and its operation will be best understood from the accompanying drawings, taken in conjunction with the accompanying description, in which similar reference characters refer to similar parts, and in which:

DESCRIPTION OF THE PREFERRED EMBODIMENTS

Figure 1:
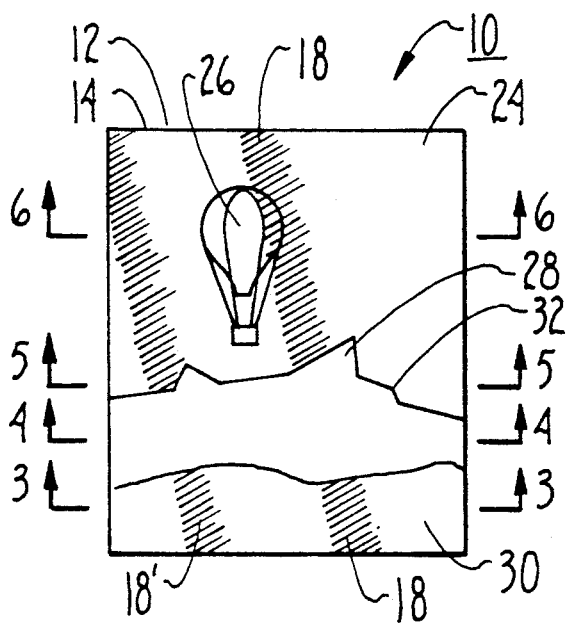
FIG. 1 is a front elevational view of a sign.

Referring initially to FIG. 1, signage according to the present invention is shown and generally designated 10. The sign 10 includes a transparent substrate 12 on which any desired image can be placed. For the purposes of the present invention, the substrate 12 can be made of any material well known in the pertinent art, such as glass of plastic. Importantly, substrate 12 is transparent to visible light. It can, however, be either clear or color tinted. Further, the substrate 12 is preferably flat, but it can be either rigid or flexible.

Figure 2:
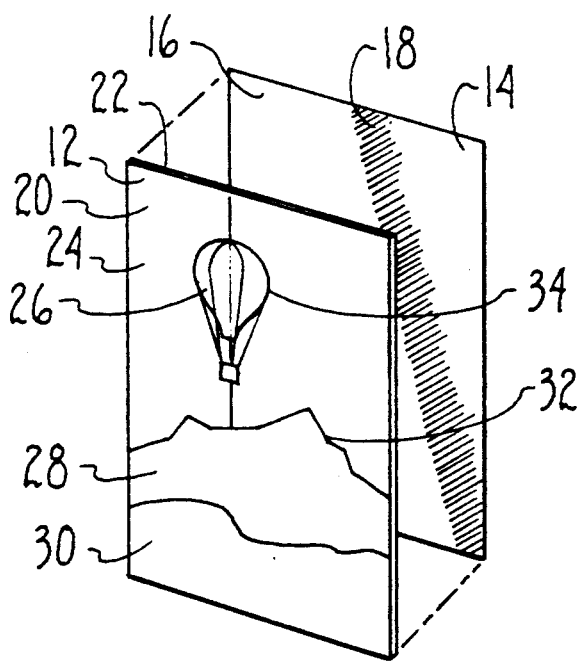
FIG. 2 is an exploded perspective view of the sign shown with the holographic film separated from the substrate.

FIG. 2 shows an exploded view of the structural components of the sign 10. Specifically, FIG. 2 shows the substrate 12 and a holographic film 14. For the purposes of the present invention, the holographic film 14 can be of any type well known in the pertinent art. The film 14, however, needs to have an anterior surface 16 which has been properly treated and textured to establish the light altering characteristic which creates the refractive holographic effect 18. As is easily observable when viewing a commercially obtainable holographic film 14, the holographic effect 18 presents a variable, perhaps even spectral, color cast according to the angle from which the film 14 is viewed.

FIG. 2 also shows that the substrate 12 has an anterior surface 20 and a posterior surface 22. An image, is then formed on what has been designated here as the posterior surface 22. For the purposes of this disclose, the image of interest includes a sky 24, a hot air balloon 26 which is flying in the sky 24, a mountain range 28 and, in the foreground, the countryside 30. The overall image is created by depositing colored inks onto the posterior surface 22 as desired. Preferably, the inks are relatively viscous and are curable within a relatively short period of time (e.g. six seconds). Further, it is preferred that the ink be curable with ultraviolet (UV) light.

Once the image has been placed onto the posterior surface 22 of transparent substrate 12, the anterior surface 16 of holographic film 14 is attached to the posterior surface 22 of substrate 12 with the image positioned therebetween. For purposes of the present invention, any clear adhesive which is well known in the pertinent art can be used to affix the film 14 to the substrate 12. Further, this adhesive can be either a thermal or a pressure adhesive.

To continue the disclosure here, the countryside 30 and the hot air balloon 26 will be considered to be created using only a colored transparent ink. The mountains 28 will be considered to be created using a colored ink which has been overcoated with an opaque ink layer. On the other hand, the sky 24 is created by not using any such ink. Further, if additional highlighting is desired, the mountains 28 can be accentuated using an outline etching ink 32, and the hot air balloon 26 can also be so accentuated using an outline etching ink. With these generalized creations, the cooperation of the various elements in sign 10 will be best appreciated by cross referencing FIG. 1 with FIGS. 3-6.

Figure 3:
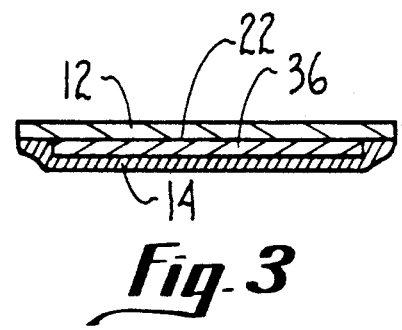
FIG. 3 is a cross-sectional view of the sign as seen along the line 3—3 in FIG. 1.

From FIG. 3 it will be appreciated that the countryside 30 is created with a layer of transparent colored ink 36 which is deposited to be steadfastly attached onto the posterior surface 22 of the substrate 12. The holographic film 14 is then adhered to the substrate 12 and the ink 36.

Figure 4:
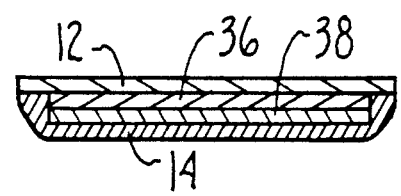
FIG. 4 is a cross-sectional view of the sign as seen along the line 4—4 in FIG. 1.

FIG. 4 shows that an opaque ink 38 can be coated over the transparent colored ink 36 and the film 14 then attached to the substrate 12 and the opaque ink 38. This changes the artistic visual appearance of the sign 10 in that the opaque ink 38 effectively blocks the holographic effect 18 of the holographic film 14. Thus, in additional to whatever color variations the manufacturer of sign 10 may want to display between the countryside 30 and the mountains 28, there is also a variation in the holographic effect 18.

As mentioned above, it is possible to include etching highlights with the incorporation of an outline etch, such as the outline etch 32 for the mountains 28 and the outline etch 34 for the hot air balloon 26. It happens that the outline etches 32 and 34 can be incorporated using ridges of exceptionally or extraordinarily thick inks. In practice, the outline etches 32 and 34 are made of transparent inks which are deposited onto the posterior surface 22 of substrate 12 substantially as shown and are approximately fifty (50) times thicker than the colored inks used to create the images of the mountains 28 or the hot air balloon 26. The manner for depositing these outline etches 32 and 34 are well known. Indeed, a method for creating these etches is disclosed in U.S. Pat. No. 4,933,218.

Figure 5:
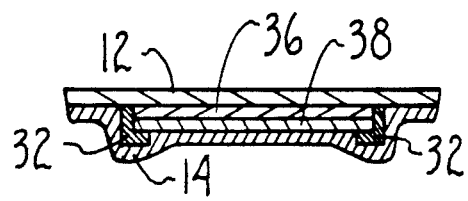
FIG. 5 is a cross-sectional view of the sign as seen along the line 5—5 in FIG. 1.
Figure 6:
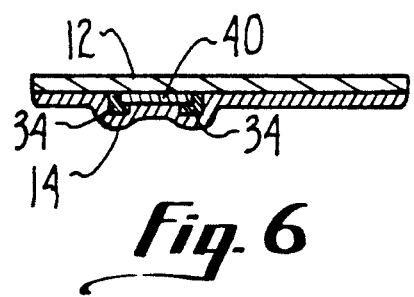
FIG. 6 is a cross-sectional view of the sign as seen along the ling 6—6 in FIG. 1.

FIGS. 5 and 6 show how the outline etches 32 and 34 are employed. Specifically, FIG. 5 shows a cross section through the mountains 28 where an opaque ink 38 was used to overcoat the colored ink 36, and FIG. 6 shows a cross section through the hot air balloon 26 where the etch 34 outlines an image which was created using only a colored ink 40.

The result is a sign 10 which artfully incorporates holographic highlights. Specifically, the holographic effect 18 from film 14 is observable through both the transparent substrate 12 and those portions of the image which are created by using only a transparent colored ink 36,40. On the other hand, the holographic effect 18 is not observable through those portions of substrate 12 where and opaque ink 38 has been deposited. Further, the holographic effect 18', which is shown in FIG. 1, indicates that the holography will vary across the sign 10. It may, however, be manifested as a general color cast to the sign. The holographic highlights of the sign 10 can be additionally enhanced by using a light box 42. Typically, this enhancement is accomplished by placing the light source (not shown) in the light box 42 along the periphery of the sign 10. The light source, however, may also, or alternately, placed behind to shine through openings (not shown) which may be left in the holographic film 14.

While the particular Promotional Display Signage and Method of Manufacture as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

I claim:

1. A decorative promotional display signage having holographic highlights which comprises:

a clear transparent substrate, said substrate being substantially flat and having an anterior surface and a posterior surface;

at least one transparent layer of colored ink deposited on selected portions of said posterior surface of said substrate to create an intended informational image thereon;

a sheet of holographic film having an anterior surface and a posterior surface, said anterior surface being textured to spectrally refract light and present a variable color cast according to the angle from which said film is viewed to highlight said informational image on said substrate; and an adhesive, said adhesive being coated onto said anterior surface of said sheet of holographic film to hold said anterior surface of said sheet against said posterior surface of said substrate with said layer of colored ink therebetween.

2. A display signage as recited in claim 1 further comprising a layer of clear transparent ink deposited on selected portions of said posterior surface of said substrate, said clear ink being deposited compatibly with said colored ink to emphasize said image created by said colored ink.

3. A display signage as recited in claim 1 wherein said signage responds to a peripherally located external light source directed at said holographic film to accentuate said variable color cast of said holographic film.

4. A display signage as recited in claim 1 wherein a plurality of colored transparent inks are deposited on said posterior surface of said substrate to create said informational image.

5. A display signage as recited in claim 1 further comprising a layer of opaque ink deposited directly against selected portions of said colored ink to block the color cast effect of said holographic film.

6. A display signage as recited in claim 1 wherein said clear transparent substrate is glass.

7. A display signage as recited in claim 1 wherein said clear transparent substrate is plastic.

8. A display signage as recited in claim 7 wherein said substrate is flexible.

9. A display signage as recited in claim 1 wherein said adhesive is a pressure adhesive.

10. A display signage as recited in claim 1 wherein said adhesive is a thermal adhesive.

11. A method for manufacturing a decorative promotional display signage having holographic highlights which comprises the steps of:
   selecting a clear transparent sheet substrate having an anterior surface and a posterior surface;
   depositing a layer of at least one transparent colored ink onto selected portions of said posterior surface of said substrate to create an intended informational image thereon;
   selecting a sheet of holographic film having an anterior surface and a posterior surface, said anterior surface being textured to spectrally refract light and present a variable color cast according to the angle from which said film is viewed to highlight said informational image on said substrate; and
   coating an adhesive onto said anterior surface of said sheet of holographic film to hold said anterior surface of said sheet against said posterior surface of said substrate with said layer of colored ink therebetween.

12. A method for manufacturing display signage as recited in claim 11 further comprising the step of depositing a clear ink on selected portions of said posterior surface of said substrate, said clear ink being deposited compatibly with said colored ink to emphasize said image created by said colored ink.

13. A method for manufacturing display signage as recited in claim 12 further comprising the step of depositing a layer of opaque ink directly against selected portions of said colored ink to block the color cast effect of said holographic film.

14. A method for manufacturing display signage as recited in claim wherein said clear transparent substrate is glass.

15. A method for manufacturing display signage as recited in claim 11 wherein said clear transparent substrate is plastic.

16. A method for manufacturing display signage as recited in claim 15 wherein said substrate is flexible.

17. A method for manufacturing display signage as recited in claim 11 wherein said adhesive is a pressure adhesive.

18. A method for manufacturing display signage as recited in claim 11 wherein said adhesive is a thermal adhesive.

* * * * *